June 1, 1943.                R. C. HOWELL                2,320,601
                             INDUSTRIAL TRUCK
                            Filed Jan. 20, 1943            3 Sheets-Sheet 1

INVENTOR
*Roy C. Howell*
BY
*Frank S. Greene*
ATTORNEY

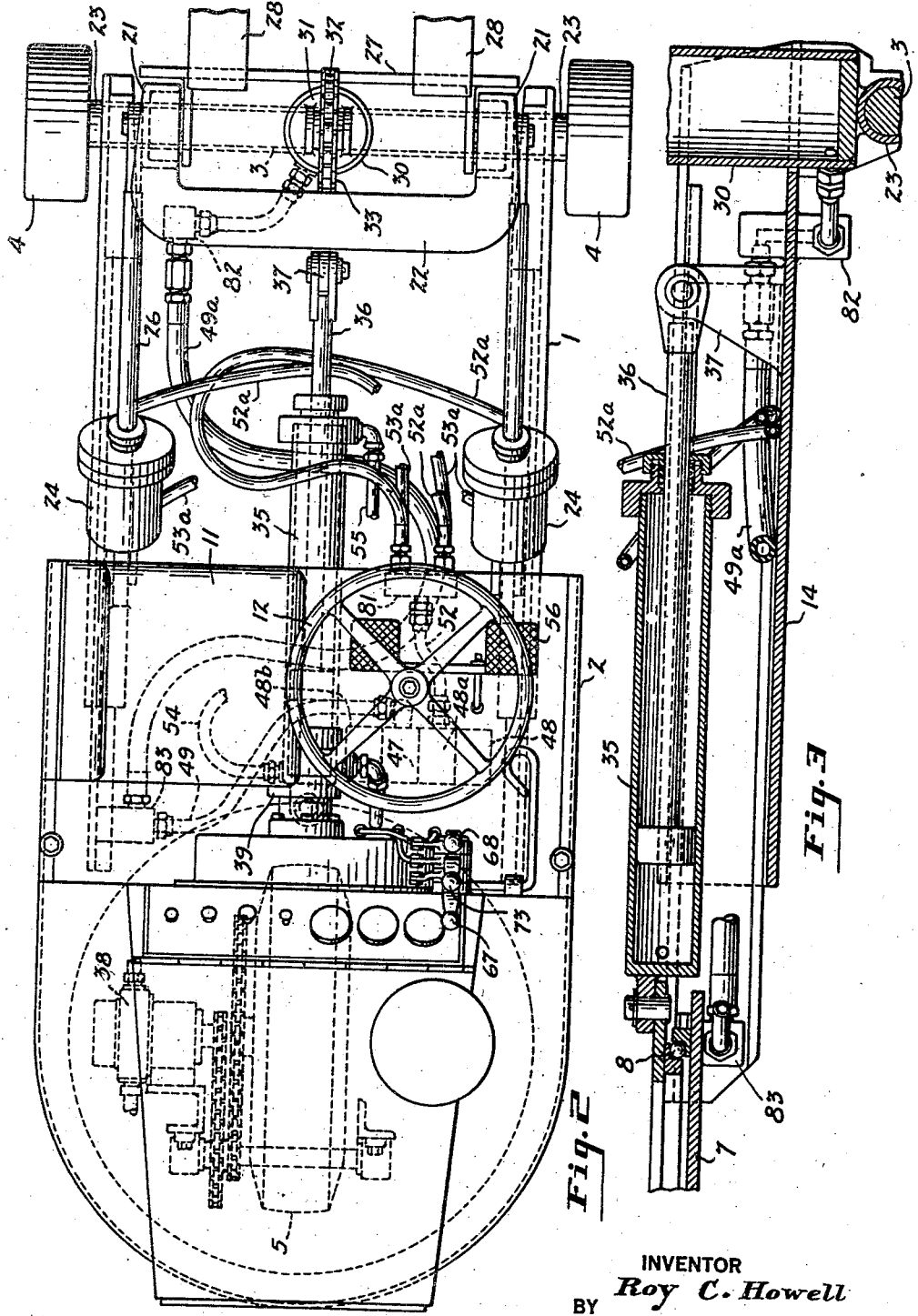

June 1, 1943.   R. C. HOWELL   2,320,601
INDUSTRIAL TRUCK
Filed Jan. 20, 1943   3 Sheets-Sheet 3
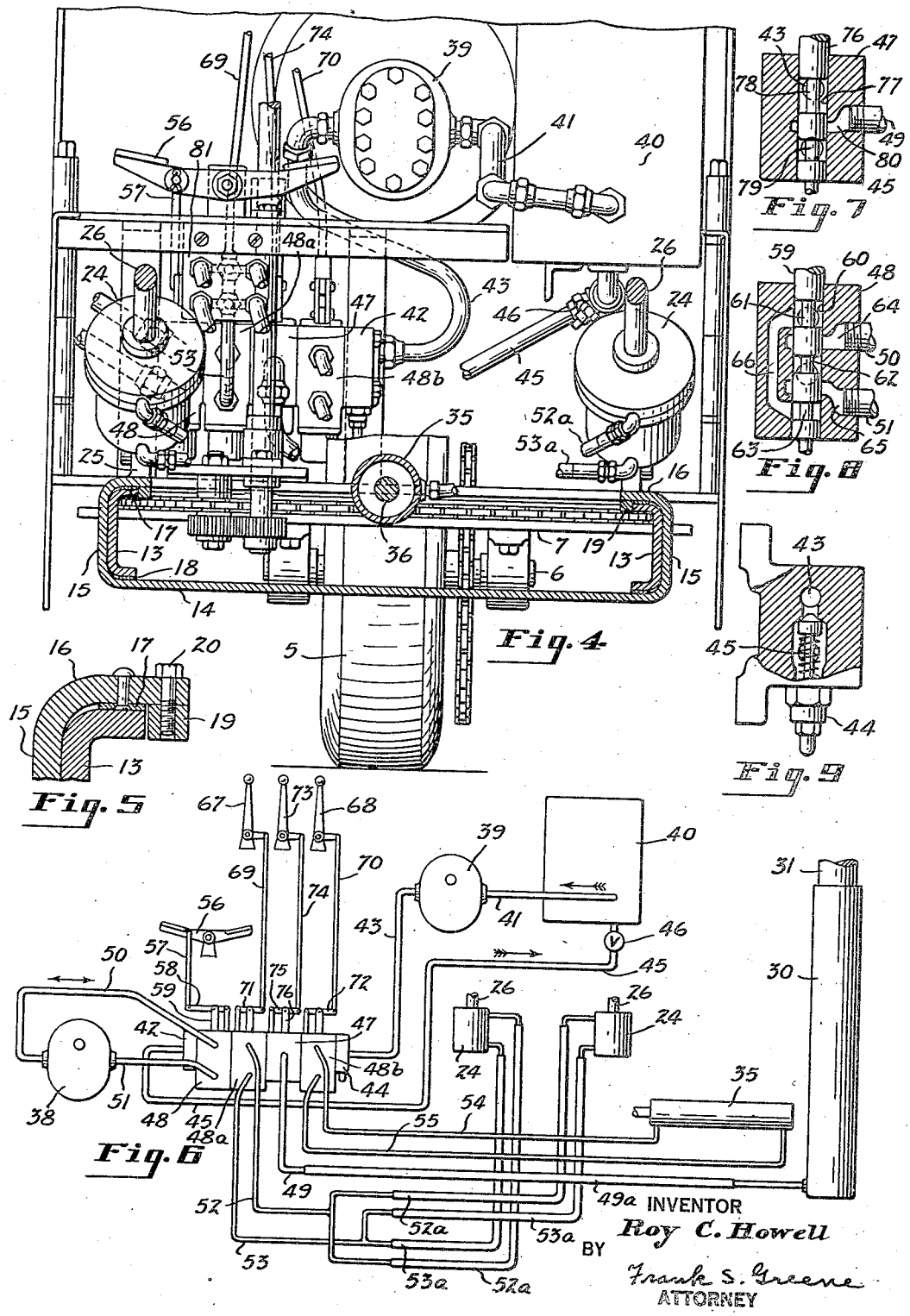
INVENTOR
Roy C. Howell
BY
Frank S. Greene
ATTORNEY Patented June 1, 1943

2,320,601

UNITED STATES PATENT OFFICE 2,320,601

INDUSTRIAL TRUCK

Roy C. Howell, Lakewood, Ohio

Application January 20, 1943, Serial No. 472,973

12 Claims. (Cl. 214—113)

This invention relates to industrial trucks, and particularly to motor driven trucks of the type having an elevator at the forward end thereof. Industrial trucks of the elevator type are ordinarily provided with a vertically movable carriage having a load-carrying platform projecting forwardly from the front end of the truck. Such trucks are often designed to handle loads weighing many tons. In order to prevent the truck from overbalancing the entire truck sufficiently to tilt it about the front axle as a fulcrum or to reduce the load imposed upon the rear driving wheels to such an extent that traction is impaired, it has been common practice to add a substantial weight to or build the same into the rear end of the truck, sufficient to maintain traction when the truck is carrying the maximum load. The provision of a counterweight adds to the expense of construction and the additional weight of the truck increases the cost of operation due to more rapid consumption of fuel and more rapid wear of tires.

It is the object of the present invention to provide a lift truck of the character referred to which is so constructed that counterweighting is unnecessary and which may consequently be of lighter and more economical construction.

More specifically, it is the object of the invention to provide a truck having an extensible body or a frame so that the leverage of the truck body may be increased by increasing its length, so that the truck body may be adjusted to effectively overbalance any load being handled.

A further object is to provide a simple and conveniently operable means for telescoping the truck frame and operating the elevator.

Another advantage of the invention is the fact that the truck will operate in extremely close quarters when handling relatively light loads, while it is also possible to use the same truck for handling very heavy loads when not restricted by space limitations, the truck of the present invention being thus adapted to do work which heretofore would have required two trucks of different capacities.

With the above and other objects in view, the invention may be said to comprise the truck as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 2 is a top plan view of the truck;

Fig. 3 is a fragmentary central vertical section through the frame telescoping cylinder and the lower portion of the carriage hoist cylinder;

Fig. 4 is a transverse section taken on the line indicated at 4—4 in Fig. 1;

Fig. 5 is a fragmentary sectional view on an enlarged scale showing the sliding connection between the front frame section and the side members of the rear frame section;

Fig. 6 is a diagrammatic view showing the fluid pressure system for operating the cylinders and wheel-driving motor;

Fig. 7 is a sectional view showing the single-action valve for controlling the hoist cylinder; and Fig. 8 is a sectional view showing a double-action valve such as used for controlling the wheel-driving motor, the frame telescoping cylinder and the tilting cylinders.

Fig. 9 is a sectional view showing the pressure operated regulating valve.

Figure 1:
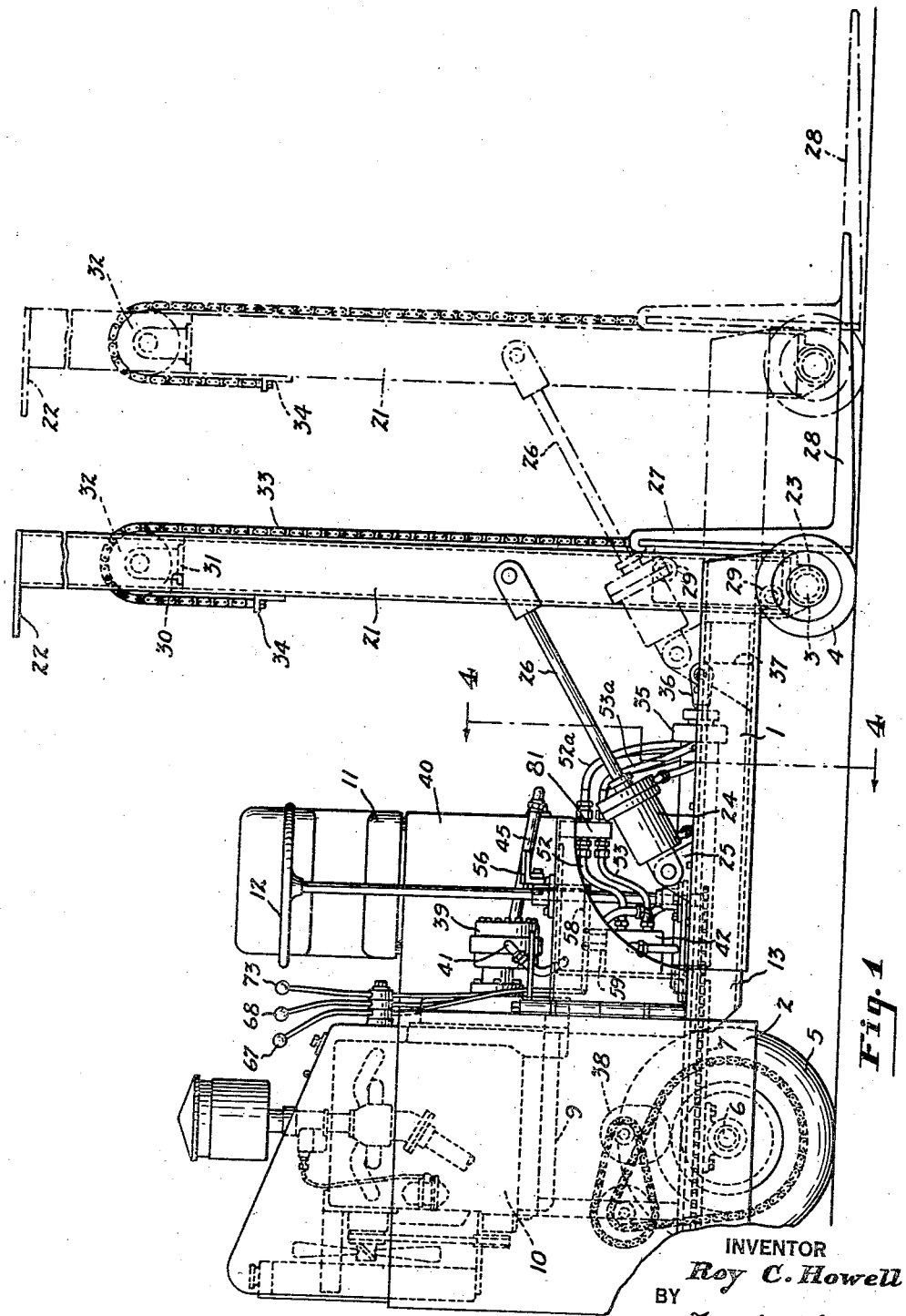
Figure 1 is a side elevation of a truck embodying the invention, the extended position of the truck frame being shown in dotted lines.

Referring to the accompanying drawings, the truck of the present invention has front and rear telescopically connected sections 1 and 2 which are adapted to be adjusted to vary the length of the wheel base. In the embodiment of the invention herein shown, the front section 1 has an axle 3 at its forward end upon which the front supporting wheels 4 are mounted. The rear end of the truck is supported upon a single traction wheel 5, which is mounted on an axle 6 mounted in a frame 7, which is swivelled in the rear frame section 2, a suitable bearing 8 being provided between the frame 7 and the rear frame section 2. The rear frame section 2 supports an elevated platform 9 directly over the supporting wheel 5, the platform 9 providing a support for a suitable motor such as an internal combustion engine 10.

Immediately in front of the engine 10, a laterally facing driver's seat 11 is mounted upon the rear frame section 2 and in front of the seat is mounted a steering wheel 12, which is connected by suitable gearing to the wheel frame 7 so that the wheel 5 may be turned to steer the truck. The rear frame section 2 has channel-shaped side frame members 13 which project forwardly from the wheel frame bearing 8; the front section 1 has a body in the form of a plate 14 which has upturned side edge portions 15, which are adapted to receive the frame members 13 between them and which have inwardly projecting flanges 16 which overlie the top edges of the frame members 13.

Upper and lower wear strips 17 and 18 are interposed between the flanges 16 and the top edge of the frame channels 13 and between the body of the plate 14 and the lower flanges of the channels 13, the strips being preferably secured to the flanges 16 and the plate 14. A guide strip 19 is detachably secured to the undersides of the flanges 16 inwardly of the channel frame members 13 by means of bolts 20. The side frame members 13 are adapted to slide longitudinally in the front section 1 to permit extension of the truck frame.

At the front end of the frame section 1 there is mounted an elevator guide standard composed of side posts 21 in the form of inwardly facing channels and a top cross member 22 which connects the upper ends of the posts 21. The posts 21 are attached at their lower ends to a sleeve 23 rotatably mounted upon the axle 3. The guide standard is held in vertical position or in positions inclined slightly to the vertical by means of cylinders 24 which are pivoted to brackets 25 attached to the flanges 16 rearwardly of the posts 21, the cylinders 25 having pistons 26 pivoted at their forward ends to the posts 21. When the pistons 26 are at their forward limits of movement, the elevator standard is held nearly in vertical position preferably with about 2 degrees forward tilt, and the standard may be held in various rearwardly tilted positions by means of fluid under pressure in the cylinders 24.

A carriage 27 is mounted for vertical travel on the guide standard, the carriage having a forwardly projecting load-carrying platform 28 and the rollers 29 which travel on the flanges of the channel posts 21. A hoist cylinder 30 is mounted on the sleeve 23 between the posts 21 and has a piston 31 carrying a sprocket 32 at its upper end. A sprocket chain 33 is attached at one end to the carriage 27, extends over the sprocket 32 and is attached at its opposite ends to a crossbar 34 attached to the rear side of posts 21. By supplying fluid under pressure to the lower end of the cylinder 30, the sprocket 32 may be elevated to lift the carriage 27. The cross bar 22 may have its central portion offset rearwardly, as shown in Fig. 2, to permit the sprocket 32 to be elevated past the crossbar.

A cylinder 35 is attached at its rear end to the rear frame member 2 centrally thereof and has a piston 36 attached to a bracket 37 attached to the plate 14 of the front frame member. By controlling the delivery of fluid under pressure to the cylinder 35, the truck frame may be extended or retracted.

The rear supporting wheel 5 is driven by means of a hydraulic motor 38 mounted upon the frame 7 and the motor 38, as well as the various cylinders above referred to, is actuated by fluid maintained under pressure by means of a pump 39 driven by the engine 10. The fluid pressure system is illustrated diagrammatically in Fig. 6. A liquid reservoir 40 is provided on the rear frame member 2 and this liquid reservoir is connected by a pipe 41 to the pump 39. A valve unit 42 through which the flow of fluid is controlled to the cylinders 24, 30 and 35, and to the motor 38, is connected to the pump 39 by a pipe 43.

The valve unit 42 has a passage to which the pipe 43 delivers which is controlled by a pressure regulating safety valve 44 and which is connected to the reservoir 40 through a return line 45. The passage through the valve unit 42 from the pipe 43 to the return pipe 45 is controlled by a spring operated regulating valve 44, which is normally held closed by its spring but which opens when a predetermined pressure is imposed upon it to permit liquid to pass through the valve unit 42 and return to the reservoir. The setting of the valve 44 determines the pressure maintained in the pipe 43 and in the valve passages by the pump 39. The return pipe 45 may be provided with a shut-off valve 46 adjacent the bottom of the tank 40 to prevent leakage of liquid from the tank during repair of valve or cylinder parts.

The valve unit 42 has a single-acting valve 47, such as shown in Fig. 7, for controlling the supply of fluid to the hoist cylinder 30 and provided with three identical double-acting valves 48, 48a and 48b, such as shown in Fig. 8, for controlling the motor 38 and cylinders 25 and 35. A single pipe 49 connects the valve 47 with the cylinder 30 and this pipe has a flexible section 49a which is of sufficient length to permit the extension of the truck body and which is adapted to bow laterally when the front frame section of the truck is retracted. Pipes 50 and 51 connect the hydraulic motor 38 to the valve 48, pipes 52 and 53 connect the valve 48a to the tilt cylinders 24, and pipes 54 and 55 connect the valve 48b to the frame telescoping cylinder 35. The pipe 52 has branches leading to the upper ends of the two cylinders 24 and the pipe 53 has branches leading to the lower ends of the two cylinders, the branch pipes being provided with flexible sections 52a and 53a, which permit the movement of the cylinders 24 with the frame section 1 toward or away from the valve unit 42, which is mounted upon the rear frame section 2. As shown in Fig. 2, the flexible pipe sections lie upon the plate 14 and are adapted to be bowed when the front frame section 1 is retracted and to be straightened as the front frame section 1 is extended.

The propelling motor 38 is controlled by means of a pedal 56 convenient to an operator sitting on the seat 11, the pedal 56 being connected by a link 57 to a lever 58 pivoted to the top of the valve unit 42 and connected to a vertically slidable valve member 59, which, as shown in Fig. 8, is provided with a vertical bore 60 in which the member 59 has a sliding fit. The member 59 has three spaced circumferential grooves 61, 62 and 63 for controlling the flow from the pressure line 43 to the motor 38 and from the motor 38 to the return line 45.

In the position shown in Fig. 8, ports 64 and 65 leading to pipes 50 and 51 are both closed. By moving the valve member 59 downward from the position shown in Fig. 8, the pressure line 43 may be connected to the port 64 leading to the pipe 50 and the pipe 51 may be connected through the port 65 to the return line 45. Upon upward movement from the position shown, the pressure line 43 may be connected through a by-pass 66 to the port 65 and pipe 51 and pipe 50 connected through the port 64 to the return line 45. Thus, the rocking movement of the pedal 56 may cause the motor 38 to be driven in a forward or rearward direction as desired. By regulating the movement of the pedal 56, the ports 64 and 65 may be gradually opened and closed to regulate the rate of flow to the motor 38 to vary the speed at which the truck is propelled or to restrict the flow to effect a braking action.

The valves 48a and 48b controlling the cylinders 24 and 35 are identical with the valve controlling the motors 38 and are operated to tilt the elevator guide standard or to telescope the frame members by means of hand levers 67 and 68, which are connected by links 69 and 70 to levers 71 and 72, which are identical with the lever 58 above described, the levers 67 and 68 being mounted within convenient reach of an operator seated on the seat 11. The pistons of the cylinders 24 and 35 may be locked in any desired position to hold the guide standard at the desired inclination or to hold the extensible truck body in adjusted position by moving handles 67 or 68 to neutral or valve closing position.

The flow of fluid to the hoist cylinder 30 is controlled by a hand lever 73 connected by a link 74 to a lever 75 pivoted to the valve unit 42. The lever 75 raises and lowers a vertical valve member 76 which fits in a vertical bore 77 in the valve 47. As shown in Fig. 7, the valve member 76 has spaced grooves 78 and 79 which are adapted to register with the pressure and return lines 43 and 45 and with an intermediate port 80 which communicates with the pipe 49 leading to the cylinder 30. In the position shown in Fig. 7, the port 80 is closed. By moving the member 76 downwardly, the pressure line 43 may be connected to the port 80 to deliver fluid under pressure to the hoist cylinder 30; by moving the member 76 upwardly from the position shown in Fig. 7, the port 80 may be placed in communication with the return line 45 to permit the fluid to flow from the hoist cylinder 30 to the reservoir 40. The rate of flow of fluid to or from the cylinder 30 may be varied to regulate the speed of ascent or descent of the carriage 27 by adjusting the valve members 76 and the carriage 27 may be held in any position of vertical adjustment by moving the member 76 to port closing position.

All controls being disposed conveniently to the seat 11, the operator may control the propulsion of the vehicle by means of the pedal 56 and the tilting of the guide standard, the telescoping of the frame and the raising and lowering of the load by means of the levers 67, 68 and 73, each of the levers being movable in either direction from a neutral position for forward or reverse operation. The valves operated by the levers 67, 68 and 73 are closed to retain the fluid in the cylinders when the levers are in neutral position, so that the parts actuated by the cylinders may be held in adjusted positions. Thus the truck may be retained in any desired extended position, the guide standards at any desired height.

To avoid strain on the pipe lines due to the bowing of the flexible pipe sections when the frame is telescoped, pipes 52 and 53 are preferably connected to the flexible sections 52a, 53a through an anchor block 81 fixed to the rear frame section 2. The flexible section 49a of the pipe 49 is preferably connected at its ends to anchor blocks 82 and 83 fixed to the front and rear sections 1 and 2. Since the pipe 49 is somewhat larger than the pipes 52 and 53 the anchor blocks 82 and 83 are preferably placed as far apart as they can conveniently be placed so that the length of the flexible section 49a is sufficient to avoid sharp bending of the conduit when the front section is retracted.

It will be understood that modifications of the construction shown may be resorted to without departing from the spirit of this invention as defined in the appended claims.

What I claim is:

1. An industrial truck having front and rear telescopically connected wheel supported frame sections, an elevator on the front section having means for supporting a load forwardly of the supporting wheels of said section, and independently controlled means carried by the truck for propelling the same, for telescoping said sections and for operating said elevator.

2. An industrial truck having front and rear telescopically connected wheel supported frame sections, an elevator on the front section having means for supporting a load forwardly of the supporting wheels of said section, a motor mounted on the rear section, and mechanisms powered by said motor for propelling the truck, telescoping said sections and operating said elevator.

3. An industrial truck having front and rear telescopically connected wheel supported frame sections, an elevator on the front section having means for supporting a load forwardly of the supporting wheels of said section, a motor mounted on the rear section, a pump driven by said motor, fluid pressure cylinders for telescoping said frame sections and for operating said elevator, and means operably connecting said pump and cylinders.

4. An industrial truck having front and rear telescopically connected wheel supported frame sections, a guide standard at the forward end of the front section, an elevator carriage mounted on said standard and having a forwardly projecting load platform, means carried by the rear section for propelling and steering the truck, and power operated means carried by the truck for telescoping said frame sections and for hoisting said carriage.

5. An industrial truck having front and rear telescopically connected wheel supported frame sections, a pivotally mounted guide standard at the forward end of the front section, an elevator carriage mounted on said standard and having means for supporting a load forwardly of the front wheels, a motor mounted on the rear section, and mechanisms powered by said motor for propelling the truck, telescoping said sections, tilting said standard and hoisting said carriage.

6. An industrial truck comprising a rear frame section, a supporting wheel for said frame section swivelled to swing about a vertical axis, a front frame section telescopically connected with the rear frame section and having a cross member at its forward end, supporting wheels at opposite ends of said cross member, a guide standard mounted on said cross member, an elevator carriage mounted on said standard, a motor mounted on said rear section, a driving connection from said motor to said swivelled supporting wheel, means for swivelling the driven wheel to steer the truck, and means carried by the truck for telescoping said sections and for hoisting said carriage.

7. An industrial truck comprising a rear frame section, a supporting wheel for said frame section swivelled to swing about a vertical axis, a front frame section telescopically connected with the rear frame section and having a cross member at its forward end, supporting wheels at opposite ends of said cross member, a steering gear connected to said swivelled wheel, a guide standard pivoted to said cross member, an elevator carriage mounted on said standard, a motor mounted on said rear section, and mechanisms powered by said motor for driving said swivelled wheel, telescoping said sections, tilting said standard and hoisting said carriage.

8. An industrial truck comprising a rear frame section, a supporting wheel for said frame section swivelled to swing about a vertical axis, a front frame section telescopically connected with the rear frame section and having a cross member at its forward end, supporting wheels at opposite ends of said cross member, a steering gear connected to said swivelled wheel, a guide standard pivoted to said cross member, an elevator carriage mounted on said standard, a motor mounted on said rear sections, means for operating said carriage comprising a hoist cylinder mounted on said cross member, means for tilting said standard comprising a cylinder pivoted to the front frame section rearwardly of the standard and having a piston pivoted to said standard, a fluid pressure system for operating said cylinders including a pump on said rear section, conduits connecting the pump and cylinders, control valves and a motor for driving said pump, and means for telescoping said sections.

9. An industrial truck comprising telescopically connected front and rear wheel supported sections, the front section having an axle at its forward ends provided with supporting wheels at its opposite ends, a guide standard pivoted to said axle, an elevator carriage mounted on said standard, a hoist cylinder mounted on the front section and connected to said carriage, a tilt cylinder pivotally connected to said front section rearwardly of the standard and having pistons pivotally connected to the standard, a cylinder mounted on the rear section and disposed longitudinally thereof, the latter cylinder having a piston connected to the front section, and a fluid pressure system for operating said cylinders including pressure creating means mounted on the rear section and conduits connecting said means to the cylinders, the conduits connected to the cylinders on the front section having flexible portions adapted to be bowed when the front section is retracted and to be straightened when the front section is extended.

10. An industrial truck having a rear frame member having a supporting wheel swivelled to swing about a vertical axis, a platform overlying said wheel and forwardly extending side frame members, a front frame section having side portions telescopically engaging the side members of said rear section, supporting wheels and a guide standard at the forward end of the front section, an elevator carriage on said standard, a motor mounted on said platform, a pump driven by said motor, and mechanisms operated by fluid maintained under pressure by said pump for driving said swivelled wheel, telescoping said sections, and hoisting said elevator carriage.

11. An industrial truck having a rear frame member having a supporting wheel swivelled to swing about a vertical axis, a platform overlying said wheel and forwardly extending side frame members, a front frame section having side portions telescopically engaging the side members of said rear section, supporting wheels and a guide standard at the forward end of the front section, an elevator carriage on said standard, a motor mounted on said platform, a pump driven by said motor, cylinders for telescoping said frame sections and for hoisting said carriage, conduits connecting said cylinders with said pump, and valves for controlling the operation of said cylinders.

12. An industrial truck having a rear frame member having a supporting wheel swivelled to swing about a vertical axis, a platform overlying said wheel and forwardly extending side frame members, a front frame section having side portions telescopically engaging the side members of said rear section, supporting wheels and a guide standard at the forward end of the front section, an elevator carriage on said standard, a motor mounted on said platform, a pump driven by said motor, cylinders for hoisting said carriage and tilting said standard mounted on said front section, conduits connecting said cylinders with said conduits including elongated flexible sections connected to said cylinders, supporting means for said flexible conduit sections, and valves for controlling the operation of said cylinders.

ROY C. HOWELL.